(12) United States Patent
Lee et al.

(10) Patent No.: US 10,091,711 B2
(45) Date of Patent: Oct. 2, 2018

(54) NETWORK SEARCHING BY DEVICE SUPPORTING MULTIPLE COMMUNICATION METHODS

(71) Applicant: Samsung Electronics Co., Ltd., Gyeonggi-do (KR)

(72) Inventors: Doo-Hwan Lee, Gyeonggi-do (KR); Young-Ho Yoon, Gyeonggi-do (KR); Jun-Ki Seo, Gyeonggi-do (KR); Sung-Hyun Ryu, Daegu (KR); Ki-Won Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 166 days.

(21) Appl. No.: 14/604,994

(22) Filed: Jan. 26, 2015

(65) Prior Publication Data
US 2015/0215857 A1 Jul. 30, 2015

(30) Foreign Application Priority Data

Jan. 28, 2014 (KR) ........................ 10-2014-0010916

(51) Int. Cl.
*H04W 88/06* (2009.01)
*H04W 48/16* (2009.01)
*H04W 36/00* (2009.01)
*H04L 5/14* (2006.01)

(52) U.S. Cl.
CPC ........... *H04W 48/16* (2013.01); *H04L 5/1469* (2013.01); *H04W 36/0022* (2013.01); *H04W 88/06* (2013.01)

(58) Field of Classification Search
USPC .............................. 370/280; 455/432.1, 434
See application file for complete search history.

(56) References Cited

U.S. PATENT DOCUMENTS

| | | | |
|---|---|---|---|
| 9,001,784 B2* | 4/2015 | Ramachandran | ........................... H04W 36/0022 370/331 |
| 2009/0036123 A1* | 2/2009 | Jeon | ....................... H04W 48/16 455/434 |
| 2010/0284333 A1* | 11/2010 | Shirota | ............. H04W 36/0022 370/328 |
| 2011/0003590 A1* | 1/2011 | Yoon | ................... H04W 36/385 455/432.1 |
| 2011/0092198 A1* | 4/2011 | Miyata | .............. H04W 36/0022 455/422.1 |
| 2011/0306316 A1 | 12/2011 | Wu | |
| 2012/0163249 A1* | 6/2012 | Chin | .................. H04W 36/0066 370/280 |
| 2012/0257494 A1* | 10/2012 | Chin | ................. H04W 36/0027 370/221 |

(Continued)

*Primary Examiner* — Edan Orgad
*Assistant Examiner* — Emmanuel Maglo
(74) *Attorney, Agent, or Firm* — Cha + Reiter, LLC.

(57) ABSTRACT

A method and device for searching for a network in a wireless communication environment supporting a plurality of communication methods are provided. An example method to support Simultaneous Voice and LTE (SVLTE) and Circuit Switch-FallBack (CSFB) involves determining a communication mode when a booting or rebooting event or no-data service event occurs, and only searching for a signal related to a selected one of the communication modes, thereby reducing total scan time needed to access a network.

9 Claims, 7 Drawing Sheets

(56) References Cited

U.S. PATENT DOCUMENTS

| | | | | |
|---|---|---|---|---|
| 2012/0258707 A1* | 10/2012 | Mathias | .............. | H04W 36/30 455/426.1 |
| 2013/0034080 A1* | 2/2013 | Yang | .............. | H04W 36/0055 370/331 |
| 2013/0109436 A1* | 5/2013 | Tat | .............. | H04W 88/06 455/558 |
| 2013/0201850 A1* | 8/2013 | Swaminathan | ... | H04W 72/1215 370/252 |
| 2013/0201890 A1* | 8/2013 | Swaminathan | ....... | H04W 88/06 370/311 |
| 2013/0287002 A1* | 10/2013 | Kim | .............. | H04W 36/0022 370/331 |
| 2014/0135061 A1* | 5/2014 | Rousu | .............. | H04B 1/0064 455/553.1 |
| 2014/0194118 A1* | 7/2014 | Liu | .............. | H04W 36/18 455/435.1 |
| 2014/0274179 A1* | 9/2014 | Zhu | .............. | H04W 52/243 455/509 |
| 2014/0308986 A1* | 10/2014 | Yang | .............. | H04W 88/06 455/552.1 |
| 2015/0065073 A1* | 3/2015 | Yan | .............. | H04B 7/0868 455/133 |
| 2015/0092611 A1* | 4/2015 | Ponukumati | ............ | H04W 4/16 370/259 |
| 2015/0105120 A1* | 4/2015 | Lim | .............. | H04W 36/0022 455/552.1 |
| 2015/0126182 A1* | 5/2015 | Dong | .............. | H04W 88/06 455/426.1 |
| 2016/0135213 A1* | 5/2016 | Zhu | .............. | H04L 1/00 370/329 |

\* cited by examiner

NETWORK SEARCHING BY DEVICE SUPPORTING MULTIPLE COMMUNICATION METHODS

CLAIM OF PRIORITY

This application claims the benefit under 35 U.S.C. § 119(a) from a Korean patent application filed in the Korean Intellectual Property Office on Jan. 28, 2014 and assigned Serial No. 10-2014-0010916, the entire disclosure of which is hereby incorporated by reference.

BACKGROUND

1. Field of the Invention

The present disclosure relates generally to wireless electronic devices, and more particularly, to searching for a network by a device supporting a plurality of communication methods.

2. Description of the Related Art

As wireless electronic devices such as smart phones have proliferated, data service use has explosively risen. The rise in data demand strained the loads of 2G/3G mobile communication systems, leading to the launch of a Long Term Evolution (LTE) system which provides a high speed data service. The LTE system provides a high data transmission rate as compared to a 2G/3G mobile communication system, but is a data exclusive network formed with an all-IP network and cannot thereby support voice service using only LTE system equipment.

Therefore, until an all-IP network is formed, in order to simultaneously support voice and data services, Circuit Switch-FallBack (CSFB) and Simultaneous Voice and LTE (SVLTE)/Simultaneous GSM & LTE (SGLTE) methods have been introduced.

The CSFB method disconnects an LTE data communication connection when a voice call is received or when a voice call is initiated by a device, and switches to a 3G network connection (e.g. based on Wideband Code Division Multiple Access (WCDMA)). In the CSFB method, a 3G network simultaneously supporting a voice service and a data service such as a WCDMA network is stably operated, rendering the method desirable to service providers. The SVLTE/SGLTE method has been introduced and used by service providers using a 2G/3G network (e.g., CDMA2000 EV-DO) in which voice and data communication are not simultaneously supported. The SVLTE/SGLTE method requires an antenna and a Radio Frequency (RF) chip in the electronic device for each service in order to simultaneously support voice service and LTE service. Accordingly, in the SVLTE/SGLTE method, the number of components increases and power consumption, weight, heat, and electromagnetic waves generated by a terminal may increase considerably.

In a "no-service" state, an electronic device using the SVLTE/SGLTE method may use an algorithm that searches for signals over a full band of a network, which includes 2G roaming frequencies as well as 3G and 4G designated frequencies. Due to this extensive scanning, a problem arises in that a network search time is long and a recovery time becomes slow.

SUMMARY

An aspect of the present disclosure is to solve at least the above-mentioned problems and/or disadvantages and to provide at least the advantages described below. Accordingly, an aspect of the present disclosure is to provide efficient network searching in an electronic device supporting multiple communication methods.

Another aspect of the present disclosure is to provide a method and device for reducing a network search time in a no-service state or a booting (or rebooting) state in an electronic device supporting multiple communication methods.

Yet another aspect to provide a method and device for preventing automatic conversion to a Circuit Switch-FallBack (CSFB) mode by changing to search for only a TDD_LTE/TDS-CDMA network in a data modem, when a no service event or a booting event occurs in an electronic device operating in a Simultaneous Voice and LTE (SV-LTE)/Simultaneous GSM & LTE (SGLTE) mode.

Still another aspect of the present disclosure is to provide a method and device that reduce an amount of searching for a TDD_LTE/TDS-CDMA network by changing to search for only a CSFB based network.

In accordance with one aspect of the disclosure, a method is implemented in an electronic device comprising a plurality of modems and antennas supporting first and second communication modes. The first or second communication mode is detected for subsequent communication. When the first communication mode is detected, a search is performed for a signal in at least one frequency band of a first communication protocol used in the first communication mode, without searching for a signal in at least one frequency band related to the second communication mode. The first communication mode is a mode that supports a voice service through a first modem and a first antenna and that supports a data service through a second modem and a second antenna. The second communication mode is a mode that supports voice and data services through the second modem.

In accordance with another aspect of the disclosure, an electronic device includes: a first antenna; a second antenna; a first modem connected to the first antenna; a second modem connected to the second antenna; and a controller. The controller detects a communication mode and searches for, when a first communication mode is detected, a signal in at least one frequency band of at least one first communication protocol related to the first communication mode, except in a frequency band related to a second communication mode. The first communication mode may be a mode that supports a voice service through the first modem and the first antenna and that supports a data service through the second modem and the second antenna. The second communication mode may be a mode that supports voice and data services through the second modem and the first antenna.

In accordance with another aspect of the present disclosure, a method of searching for a network in an electronic device including a plurality of modems and a plurality of antennas in order to support a Simultaneous Voice and LTE (SVLTE) communication mode and a Simultaneous GSM & LTE (SGLTE) communication mode and a Circuit Switch-FallBack (CSFB) communication mode includes: detecting a communication mode, when a booting or rebooting event or no data service event occurs; and searching for only a band corresponding to a Time-Division Synchronous Code Division Multiple Access (TD-SCDMA) or Time Division Duplex-Long Term Evolution (TDD-LTE) communication method, when the SVLTE communication mode is detected. The SVLTE/SGLTE communication mode may be a mode that supports a voice service through a first modem and a first antenna and that supports a data service through a second modem and a second antenna. The CSFB communication mode may be a mode that supports voice and data services through the second modem and the first antenna.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION

Hereinafter, embodiments of the present invention will be described in detail with reference to the drawings. Detailed descriptions of well-known functions and structures incorporated herein may be omitted to avoid obscuring the subject matter of the present invention. The terms used herein are defined according to the functions of the present invention and may vary depending on a user's or an operator's intent and usage. Therefore, the terms used herein should be understood based on the descriptions made herein.

Hereinafter, a method and electronic device for searching for a network in a wireless communication environment supporting a plurality of communication methods will be described. Herein, this type of environment will be referred to as a heterogeneous communication environment.

Herein, the phrases "searching a frequency band," "searching for a frequency band," "searching for frequencies," "searching for a network," or like phrases refer to searching for communicable signals at frequencies within a certain frequency band or bands allocated to a network.

In various embodiments of the present disclosure, an electronic device may be at least one combination of various devices such as a smart phone, a tablet Personal Computer (PC), a mobile phone, a video phone, a Netbook computer, a Personal Digital Assistant (PDA), a Portable Multimedia Player (PMP), an MPEG 3 (MP3) player, a camera, a wearable device, a wrist watch, a navigation device, a Global Positioning System (GPS) receiver, an Event Data Recorder (EDR), a Flight Data Recorder (FDR), an electronic dictionary, and a camcorder. The electronic device may support both Simultaneous Voice and LTE (SVLTE)/Simultaneous GSM & LTE (SGLTE) and Circuit Switched FallBack (CSFB). Other types of electronic devices are also possible.

Figure 1:
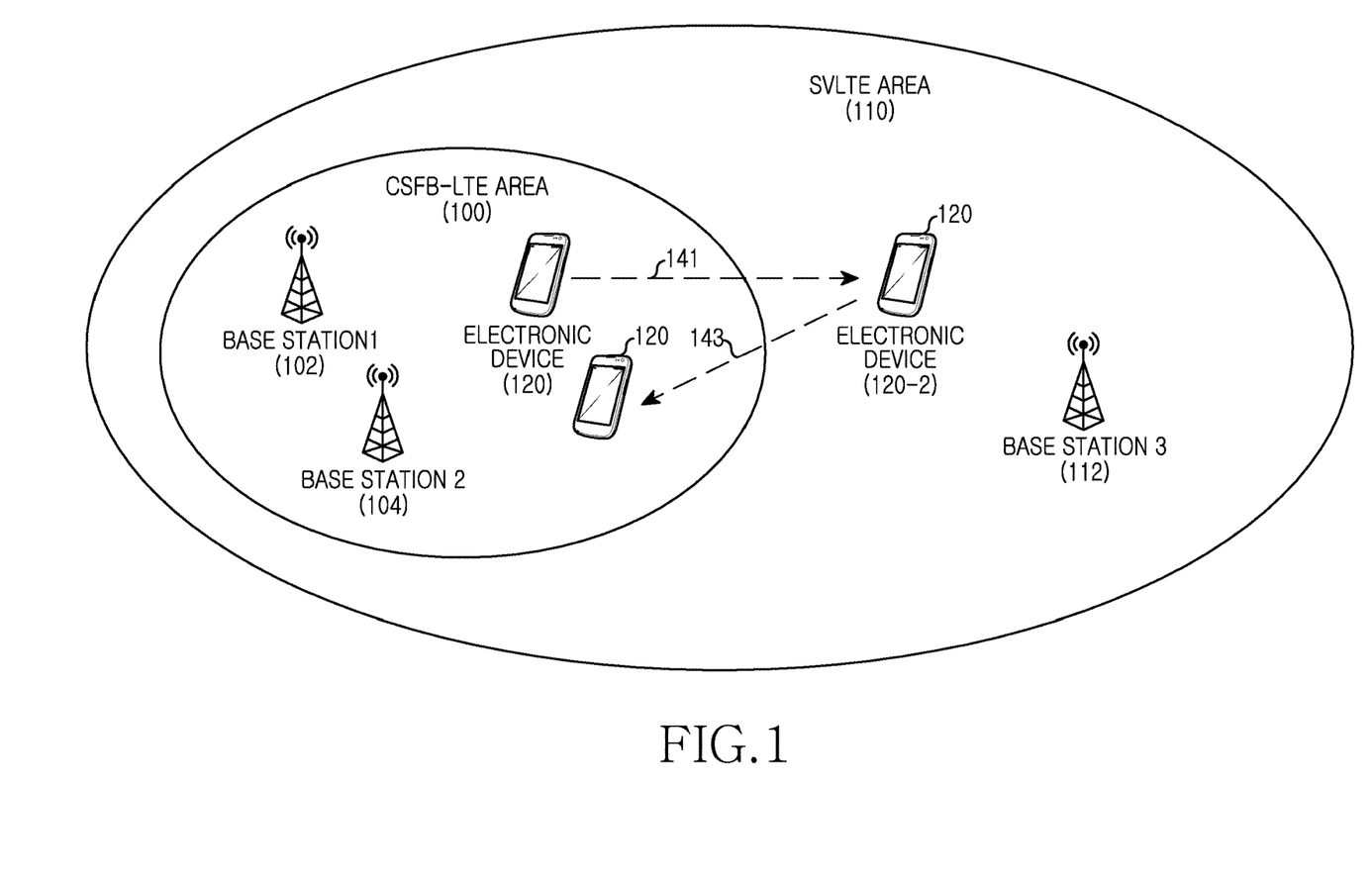
FIG. 1 is a diagram illustrating a configuration of a wireless communication system according to various embodiments of the present invention.

FIG. 1 is a diagram illustrating a configuration of a wireless communication system according to various embodiments of the present invention. An LTE area 100 (hereinafter, referred to as a 'CSFB area' or 'CFSB-LTE area') supporting CSFB may be included in an LTE area 110 (hereinafter, referred to as a 'SVLTE area') supporting SVLTE/SGLTE. Although not shown, a service area of a 2G communication system and a 3G communication system may include the CSFB area 100 and the SVLTE/SGLTE area 110. Here, the 2G communication system may include a Global System for Mobile Communication (GSM) network, an Enhanced Data GSM Environment (EDGE) network, a Code Division Multiple Access (CDMA) network, a Digital Cellular System (DCS), and a Personal Communication System (PCS). The 3G communication system may include Wideband-CDMA (W-CDMA) and Time-Division Synchronous CDMA (TD-SCDMA) networks. For example, in the CSFB area, a Frequency Division Duplex (FDD)-LTE system may be applied, and in the SVLTE area, a Time Division Duplex (TDD)-LTE system may be applied. embodiments described below with these protocol allocations will be presented. In alternative embodiments, however, in the CSFB area, a TDD-LTE system may be applied, in the SVLTE/SGLTE area, an FDD-LTE system may be applied, in the CSFB area and the SVLTE area, an FDD-LTE system may be applied, or in the CSFB area and the SVLTE area, a TDD-LTE system may be applied.

An electronic device with SVLTE/SGLTE capability may employ a first RF path for a 2G/3G service and a second RF path for an LTE service. For example, SVLTE/SGLTE may simultaneously provide a voice service and a data service through respective RF paths.

An electronic device operating according to CSFB may use one RF path and may disconnect a connection to an LTE network, access a Circuit switched (CS) network, and provide a voice service or a voice service and a data service, when a voice call is received or initiated while providing a data service through the LTE network. For example, when a data service is provided, CSFB provides a fast data connection environment via access to an LTE network. However, when a voice call is received, it is assumed that a fast data connection environment is unnecessary to a user, and CSFB switches the data service to the CS network (e.g., 2G or 3G network) and provides a voice call through the 2G or 3G network, thereby simultaneously providing the voice and data services to the user.

In various embodiments of the present invention, it is assumed that a Voice over LTE (VoLTE) service is not supported through an LTE network. When the VoLTE service is not supported, the LTE network of the CSFB area may support a voice service with a CSFB method. For example, while providing a data service based on an FDD-LTE communication method in the CSFB area, when a voice call is received, the electronic device may switch from the FDD-LTE communication method to a W-CDMA communication method and simultaneously support data and voice services.

The SVLTE/SGLTE area 110 may support a data service based on a TDD-LTE communication method and independently support a voice service based on a GSM communication method. That is, the electronic device may simultaneously perform a data service through the LTE network and a voice service through the 2G/3G network in the SVLTE/SGLTE area.

According to an embodiment, when an electronic device 120 supporting both an SVLTE/SGLTE method and a CSFB method is located within the CSFB area 100, the device may access an LTE network through a first base station 102 of the CSFB area 100 according to the CSFB method and provide data and voice services. When the electronic device 120 moves to the SVLTE/SGLTE area 110 as illustrated by path 141, it may switch its communication mode to an SVLTE/SGLTE mode. In this mode, it may access an LTE network and a 2G network through a second base station 112 of the SVLTE/SGLTE area 110, and provide data and voice services.

According to an embodiment, when device 120 is located within the SVLTE/SGLTE area 110 and providing data and voice services using SVLTE/SGLTE through base station 112 if it moves to the CSFB area 100 as indicated by path 143, it may switch its communication to mode a CSFB mode, access an LTE network through a base station 104 of the CSFB area 100, and provide data and voice services.

In a conventional device, when the device is in the SVLTE/SGLTE area 110 and a TDD-LTE/TDS-CDMA communication method for supporting a data service is in no service state or an electronic device is in a booting (or rebooting) state, the electronic device may: i) search for a frequency band corresponding to a TDD-LTE/TDS-CDMA communication method; ii) switch a mode thereof to a CSFB mode; iii) automatically search for a frequency band corresponding to FDD-LTE and WCDMA communication methods. In other words, the electronic device may search for a network over a full frequency band. With such full frequency band searching by the device, a network search time and a recovery time are extended and thus voice call drop may occur. For example, as a network search order, the electronic device may preferentially search for a network of a communication method (e.g., SVLTE/SGLTE method) supported in the area of its current location (e.g., the SVLTE/SGLTE area 110). Thereafter, the electronic device may search for a network of the remaining communication method (e.g., CSFB method). For example, in the SVLTE/SGLTE area 110, the electronic device may search for a band of TDD-LTE and TDS-CDMA communication methods of an SVLTE/SGLTE method and search for a band of FDD-LTE and WCDMA communication methods of a CSFB method. For example, in the CSFB area 100, the electronic device may sequentially search for a band of a 2G communication method for roaming, an FDD-LTE communication method, and a WCDMA communication method of a CSFB method, and follow these searches with a search for a band of TDD-LTE and TDS-CDMA communication methods of an SVLTE/SGLTE method.

In various embodiments of the present invention, when a TDD-LTE/TDS-CDMA communication method is in no service state or when the electronic device 120 is in a booting (or rebooting) state, the electronic device 120 operating in an SVLTE/SGLTE mode may search for only TDD-LTE and TDS-CDMA protocol—supported networks. This search involves scanning frequencies supported by the protocols for signals of sufficient quality by which to communicate, and attempting access to the network. In order words, the electronic device 120 may exclude a search for a signal at frequencies designated for FDD-LTE and WCDMA communication methods for a CSFB method.

In various embodiments of the present invention, the electronic device 120 may first scan a complete set of designated frequencies of SVLTE/SGLTE, and if no suitable signal is found, the device 120 may repeat the scan of SVLTE/SGLTE frequencies instead of beginning a scan for CSFB frequencies. (This may be done for a predetermined number of scan cycles.) Since CSFB signals are not available in the current area, the electronic device 120 may shorten a network search time and a recovery time by avoiding the scan over these frequencies. In an embodiment, if no SVLTE type network access is achieved after a preset number of complete scans over SVLTE frequencies, the device 120 may then begin a scan attempt for CSFB signals on CSFB frequencies.

In various embodiments of the present invention, when a CSFB related communication method (e.g., FDD LTE and WCDMA communication methods) is in a no service state or when the electronic device 120 is in a booting (or rebooting) state, the electronic device 120 operating in a CSFB mode may search only for signals provided by FDD LTE and WCDMA networks to attempt access to the network. In order words, in contrast to conventional devices, the electronic device 120 may exclude a frequency band search of a TDD-LTE/TDSCDMA communication method for an SVLTE/SGLTE mode. Accordingly, the electronic device 120 may shorten a network search time and a recovery time.

As described above, the electronic device 120 searches for only a frequency band of a TDD-LTE/TDSCDMA communication method while operating in an SVLTE area, thereby preventing a call drop from occurring in an SVLTE/SGLTE mode. That is, the electronic device 120 prevents automatic switching to a CSFB mode while operating in an SVLTE area, thereby preventing call drop from occurring in an SVLTE/SGLTE mode.

Further, the electronic device 120 searches for only WCDMA/FDD-LTE/2G networks for roaming while operating in a CSFB mode, thereby enhancing a network recovery speed. That is, the electronic device 120 prevents automatic switching to an SVLTE/SGLTE mode while operating in a CSFB mode, thereby shortening a network recovery time.

Figure 2:
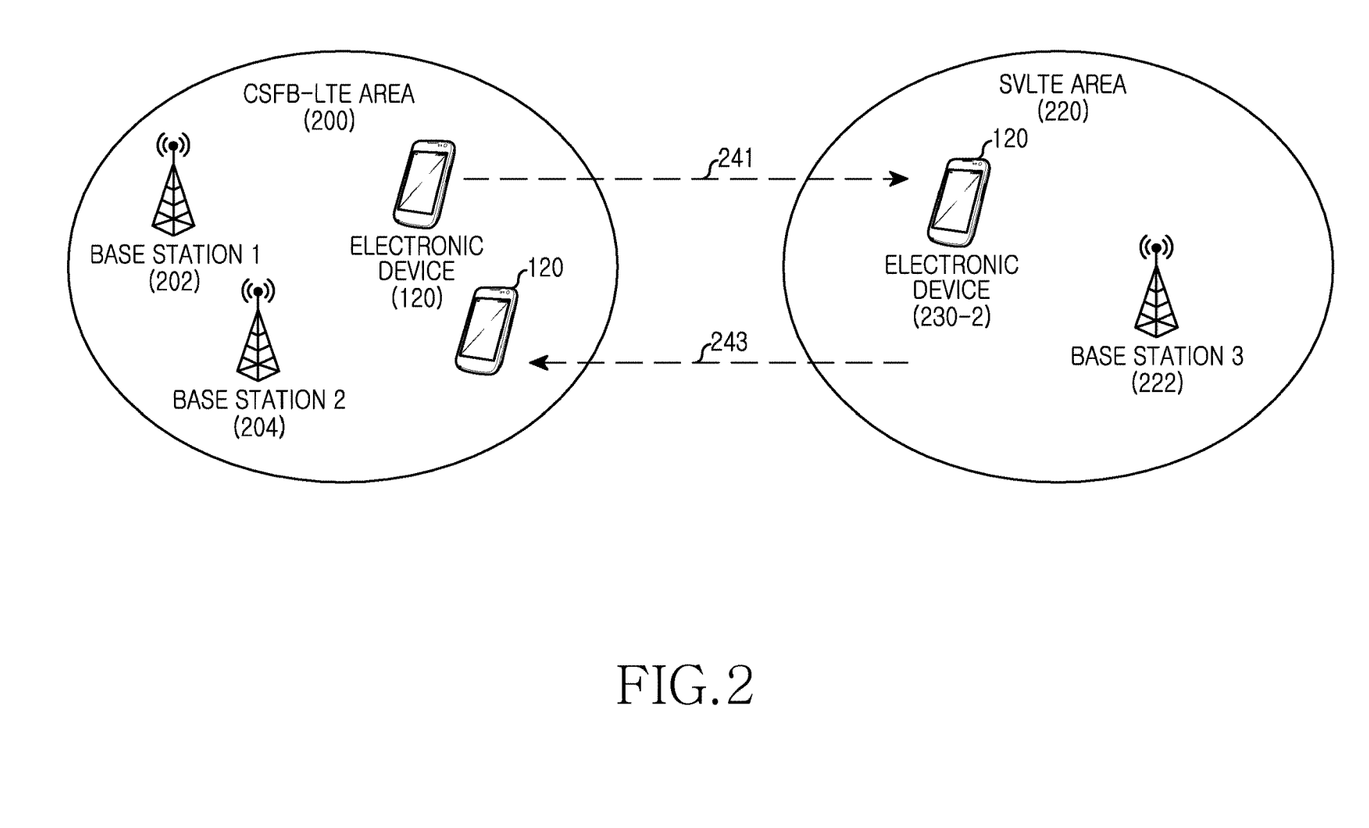
FIG. 2 is a diagram illustrating a configuration of a wireless communication system according to various embodiments of the present invention.

FIG. 2 is a diagram illustrating a configuration of a wireless communication system according to various embodiments of the present invention. This example depicts a case in which regions of a CSFB area 200 and an SVLTE/SGLTE area 220 are not co-located (and may not even overlap). The CSFB area 200 and the SVLTE/SGLTE area 220 may each cover a regional area or a national area.

Although not shown, the CSFB area 200 may support a voice service through a 3G WCDMA communication method, and the SVLTE/SGLTE area 220 may support a voice service through a 2G GSM communication method.

When an electronic device 120 supporting an SVLTE/SGLTE method and a CSFB method is located within the CSFB area 200, it may access an LTE network through a base station 202 of the CSFB area 200 according to the CSFB method and provide data and voice services. When device 120 moves from the CSFB area 200 to the SVLTE/SGLTE area 220 as indicated by path 241 or performs roaming, it may switch its communication mode to an SVLTE/SGLTE mode to access an LTE network and a 2G/3G network through a base station 222 of the SVLTE/SGLTE area 220 and provide data and voice services. Similarly, when device 120 moves from SVLTE/SGLTE area 220 to the CSFB area 200 or performs roaming, it may switch from SVLTE/SGLTE mode to a CSFB method mode to access to an LTE network through a base station 204 of the CSFB area 200 and provide data and voice services. For instance, when device 120 returns to CSFB area 200 via path 243, it is closest to base station 204 and thus detects base station 204 as a base station having a suitable signal, rather than base station 202, whereby base station 204 is selected for an access attempt.

Other aspects of communication in the system of FIG. 2 may be the same as that those described above for the system of FIG. 1.

Figure 3:
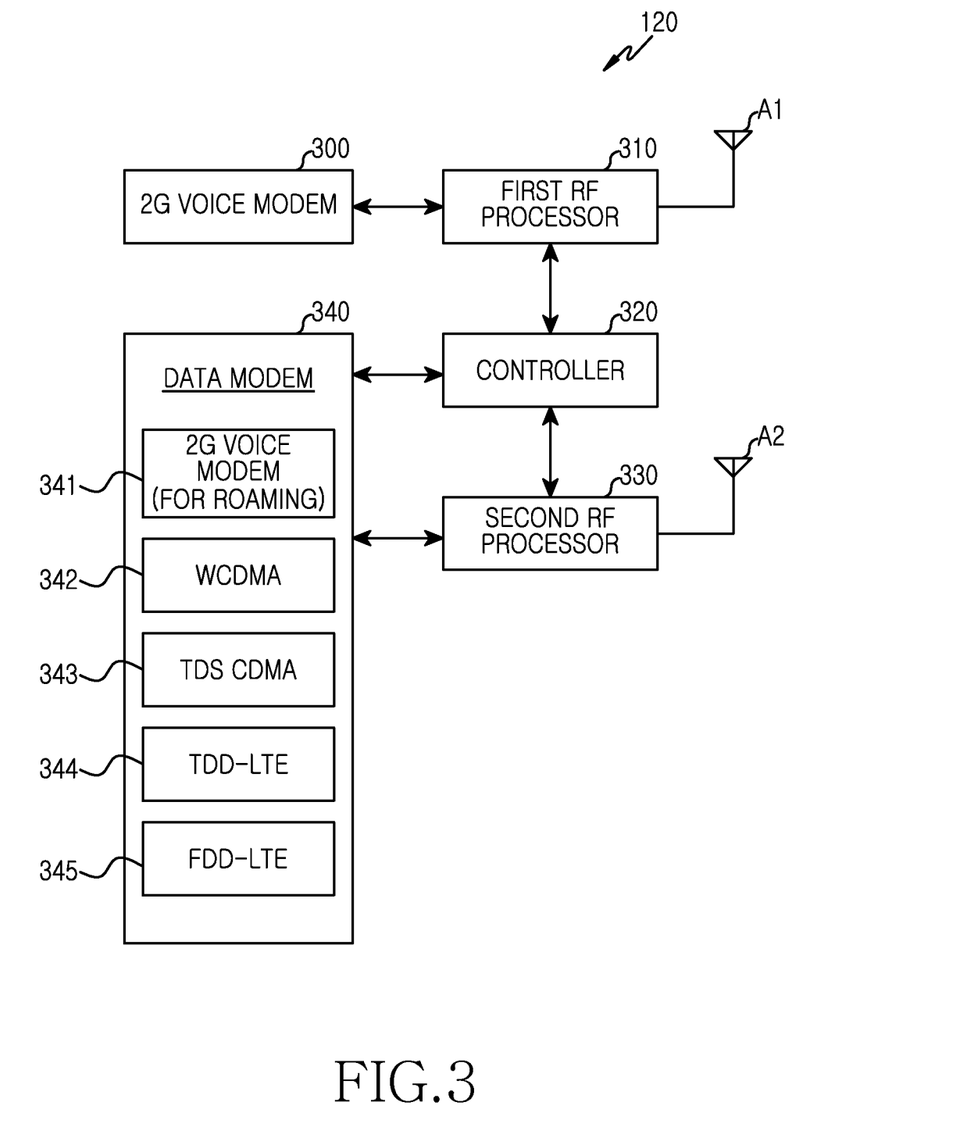
FIG. 3 is a block diagram illustrating a configuration of an electronic device according to various embodiments of the present invention.

FIG. 3 is a block diagram illustrating a configuration of electronic device 120 according to various embodiments of the present invention. Device 120 may include a 2G voice modem 300, a data modem 340 that supports CSFB, a first RF processor 310, a controller 320, and a second RF processor 330. Data modem 340 includes a 2G voice modem 341 for roaming, and modem modules for WCMA 342, TDS CDMA 343, TDD-LTE 344 and FDD-LTE 345.

The controller 320 may control the electronic device to provide various services. The following operations described in connection with FIG. 3 (as well FIGS. 4A, 4B, 5 and 6 discussed hereafter) may be performed under the control and commands of controller 320. When device 120 is located in the CSFB area 100 or 200, data and voice services may be provided according to a CSFB mode. For example, when device 120 is located in the CSFB area, the controller 320 may activate WCDMA communication module 342 and FDD-LTE communication module 345 according to a CSFB method. While a data service is provided through the FDD-LTE communication module 345, when a voice call is received, the handling of data communication may be switched over to WCDMA module 342. That is, operation by FDD-LTE communication module 345 may be suspended, and the WCDMA communication module 342 may be activated so as to provide both voice and data services.

When device 120 is located in the SVLTE area 110 or 220, data and voice services may be provided according to an SVLTE/SGLTE mode. Here, voice service may be provided through the 2G voice modem 300 and data service may be provided through TDS-CDMA module 343 or the TDD-LTE module 345.

In various embodiments of the present invention, when a booting or rebooting event occurs or when an antenna for a data service cannot provide a service in an SVLTE/SGLTE mode or in a CSFB mode, the controller 320 may search for only a frequency band of a communication method corresponding to its current location (or current communication mode (ex. CSFB mode or SVLTE/SGLTE mode). For example, in an SVLTE/SGLTE mode, i.e., when operating in an SVLTE/SGLTE area, the controller 320 may search for a network supporting a GSM or DCS voice communication method through the voice modem 300 and search for a network supporting TDD-LTE or TDS-CDMA through the data modem 340. That is, frequency band search may be performed which excludes a scan for frequencies and/or types of signals designated for a CSFB communication method (e.g., WCDMA, FDD-LTE, and 2G roaming method. In an SVLTE/SGLTE mode, voice service may be supported through a GSM/DCS method of the voice modem 300 and data service may be independently provided using a TDD-LTE or TDS-CDMA method of the data modem 340.

In a CSFB mode, i.e., when moving from an SVLTE area to a CSFB area or when roaming, the controller 320 may search for only a network corresponding to an FDD-LTE communication method, a WCDMA communication method, or a 2G roaming method (e.g., GSM, DCS) through the data modem 340. That is, the controller 320 may exclude a frequency band search corresponding to a communication method (e.g., TDD-LTE or TDS-CDMA) associated with SVLTE/SGLTE in a CSFB mode.

The first RF processor 310 may perform a communication function. For example, the first RF processor 310 may convert an RF receive signal to a baseband signal by the control of the 2G voice modem 300 and provide the baseband signal to the 2G voice modem 300. Further, on the transmit side, the first RF processor 310 converts a baseband signal from the 2G voice modem 300 to an RF signal. Here, the 2G voice modem 300 processes a baseband signal with various communication methods. For example, a communication method may include a GSM method, an Enhanced Data GSM Environment (EDGE) communication method, or a CDMA) method.

The second RF processor 330 may perform a communication function. For example, the second RF processor 330 may convert an RF receive signal to a baseband signal by the control of the data modem 340 and provide the baseband signal to the data modem 340. Further, on transmit, the second RF processor 330 converts and transmits a baseband signal from the data modem 340 to an RF signal. Here, the data modem 340 processes a baseband signal with various communication methods. For example, a communication method may include a 2G roaming method handled by 2G voice modem 341 (e.g., a GSM communication module, an EDGE communication module, or a CDMA communication module), a W-CDMA, TDS-CDMA TDD-LTE or FDD-LTE method handled by modems 342, 343, 344 or 345, respectively.

In order to support a communication service according to voice communication and roaming, a first antenna A1 is operatively coupled to the 2G voice modem 300, via connection to the 2G voice modem 300 through the first RF processor 310. Antenna A1 may be an antenna designed for an antenna resonant frequency of 880 MHz-96 MHz band, 1.7 GHz-2.1 GHz band, and/or 2.6 GHz band.

In order to support LTE data communication, a second antenna A2 connected to the data modem 340 through the second RF processor 330 may be designed for an antenna resonant frequency of 1.7 GHz-2.3 GHz band.

The first antenna A1 routes signals to/from the 2G voice modem 300 to support a voice service in an SVLTE mode. The second antenna A2 routes signals to/from the data modem 340 to support a data service in an SVLTE mode.

In the CSFB mode, the first antenna A1 routes signals to/from the data modem 340 to support voice and data services. As such, the first antenna A1 is operatively coupled to the data modem 340 in the CSFB mode.

Figure 4A:
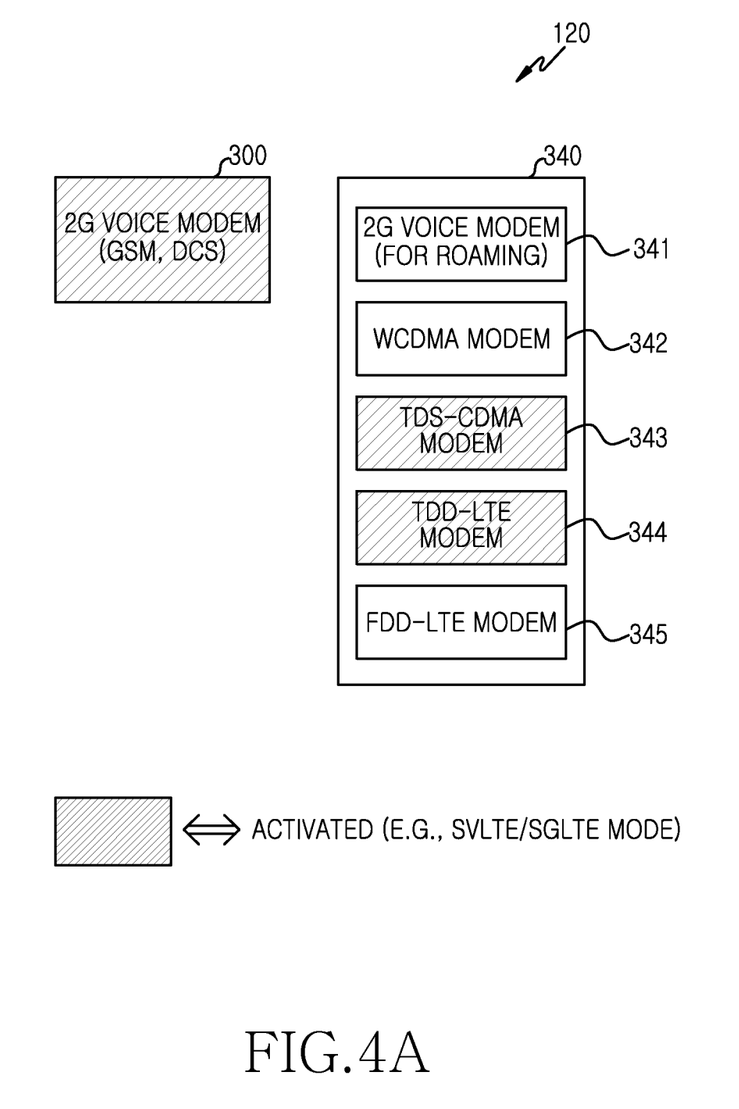
FIG. 4A is a diagram illustrating a state of a corresponding communication method before roaming or in an SVLTE mode in a wireless communication environment supporting a plurality of communication methods according to various embodiments of the present invention.

FIG. 4A is a diagram illustrating activated elements of device 120 in a communication state before roaming or in an SVLTE/SGLTE mode according to an example. This state is supported in the voice modem 300 and elements of the data modem 340 for supporting an SVLTE/SGLTE mode.

According to an embodiment, in an SVLTE mode, a GSM or DCS module of the voice modem 300 may be activated, and TDS-CDMA modem 343 and TDD-LTE modem 344 of the data modem 340 may be activated. 2G voice communication module (e.g., GSM, DCS, and CDMA) 341 for roaming, WCDMA communication module 342, and FDD-LTE communication module 345 of the data modem 340 may be inactivated. It is noted here that FIG. 4A is an example of an SVLTE/SGLTE mode used by communication providers in China. However, other schemes are possible, such that a communication method to be deactivated and activated in an SVLTE/SGLTE mode according to a communication provider policy may variously exist.

Figure 4B:
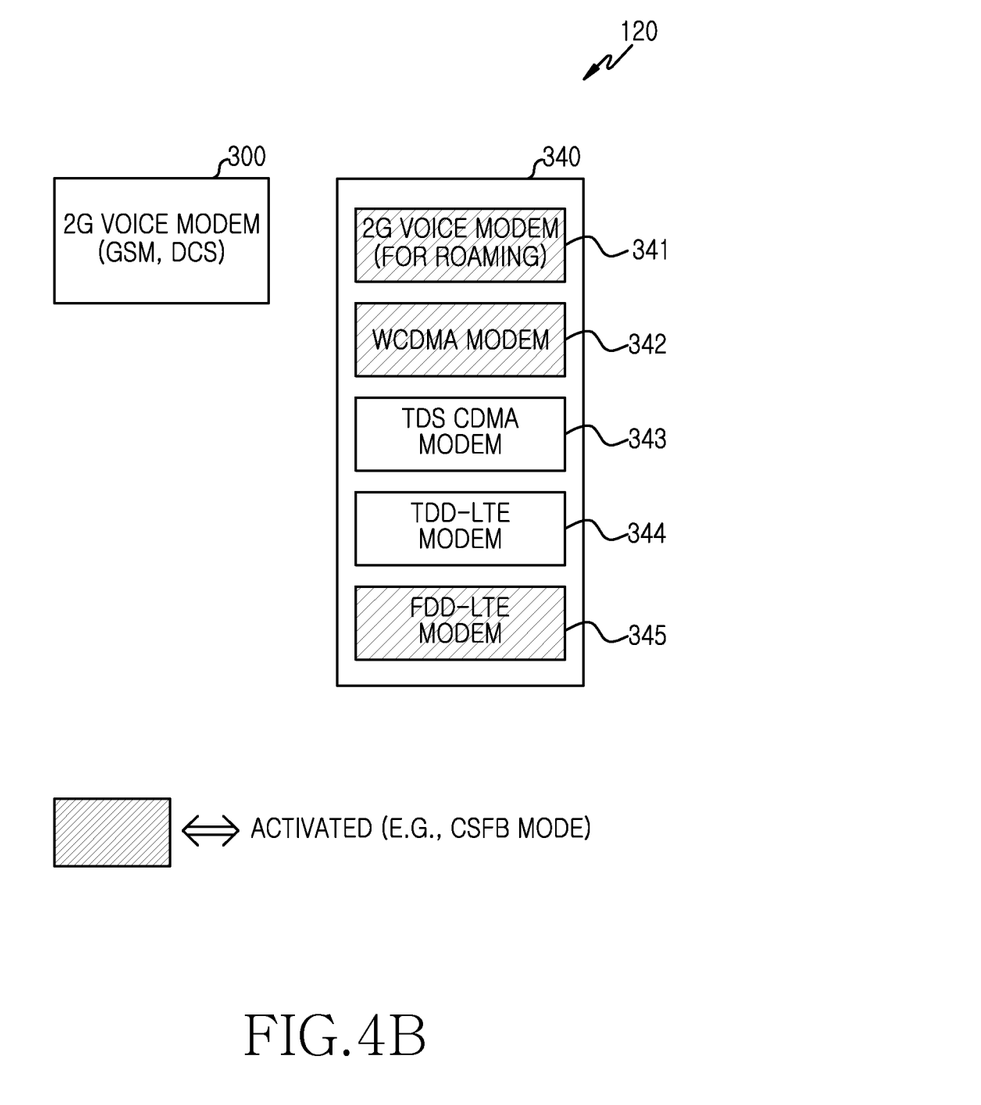
FIG. 4B is a diagram illustrating a state of a corresponding communication method after roaming or in a CSFB mode in a wireless communication environment supporting a plurality of communication methods according to various embodiments of the present invention.

FIG. 4B is a diagram illustrating a state of a corresponding communication method after roaming or in a CSFB mode in a wireless communication environment supporting a plurality of communication methods according to various embodiments of the present invention. The state depicted is an activated state of a communication method supported in the data modem 340 and the voice modem 300 for supporting a CSFB mode.

According to an embodiment, in a CSFB mode, a GSM/DCS module of the voice modem 300 may be deactivated, and the TDS-CDMA modem 343 and the TDD-LTE modem 344 of the data modem 340 may be deactivated. The 2G voice roaming method (e.g., the GSM, DCS, and CDMA modem 341), the WCDMA modem 342, and the FDD-LTE modem 345 may be activated.

Figure 5:
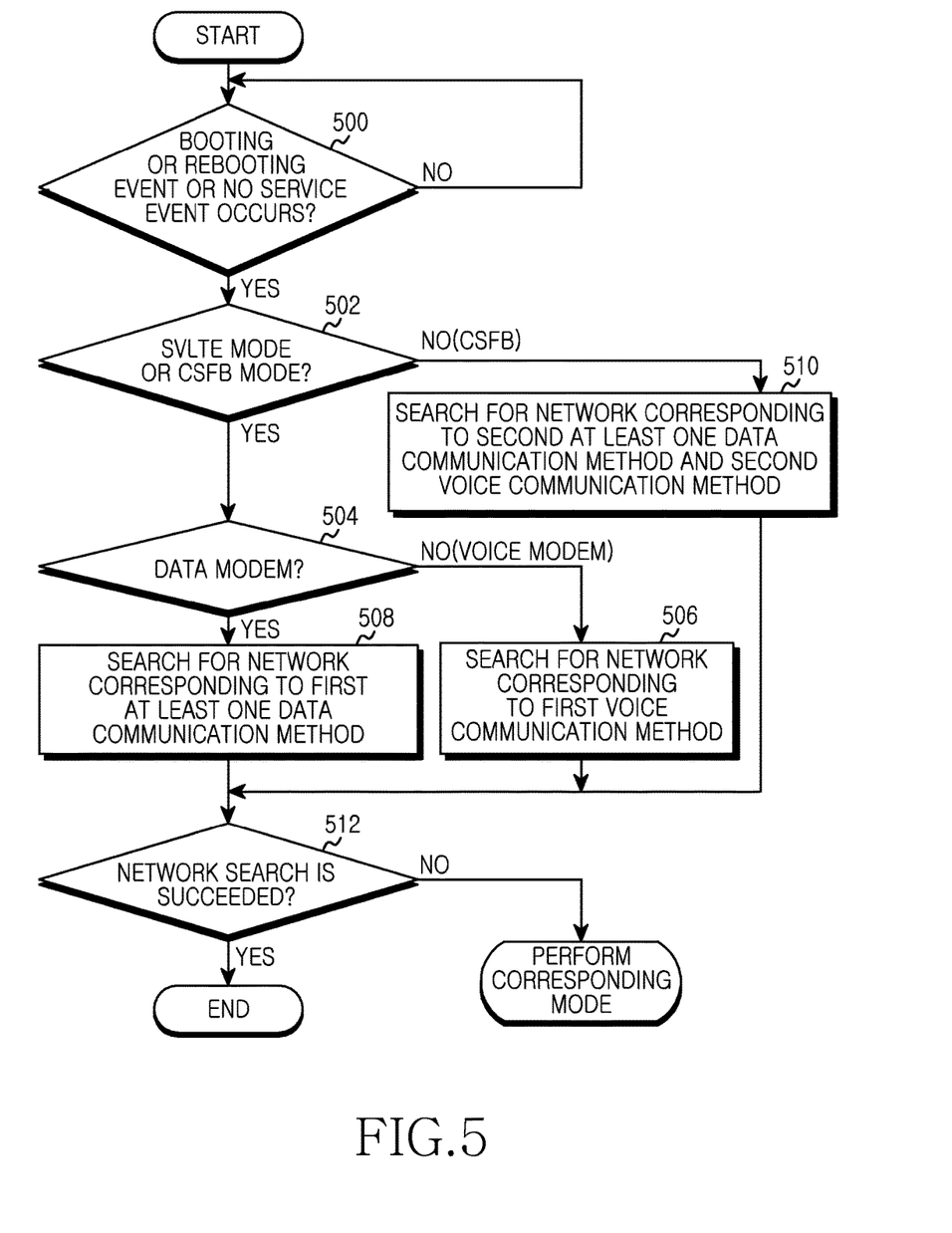
FIG. 5 is a flowchart illustrating a network search method in a wireless communication environment supporting a plurality of communication methods according to various embodiments of the present invention.

FIG. 5 is a flowchart illustrating a network search method in a wireless communication environment supporting a plurality of communication methods according to various embodiments of the present invention. At the outset of the method, the controller 320 determines whether a booting, rebooting event or a no service event occurs (500). If any of these events occur, the process 320 determines whether the electronic device 120 is in an SVLTE/SGLTE mode or a CSFB mode (502). For example, when a booting or rebooting event occurs, device 120 may assume that the current communication area (which determines the communication method to try, i.e. SVLTE or CSFB) is the same as the last communication area in which device was located, i.e., the area in which the most recently used communication session prior to the booting or rebooting took place. A no service event may indicate a state in which a signal is not received through an antenna designated for a band of a most recently used communication method. For example, as shown in FIGS. 1 and 2, device 120 supports TDS-CDMA and TDD-LTE, but in an SVLTE area, when a signal is not received through an antenna used for TDS-CDMA and TDD-LTE, the controller 320 may determine that a no service event has occurred. For example, as shown in FIGS. 1 and 2, the device 120 supports WCDMA and FDD-LTE, but in a CSFB area, when a signal is not received through an antenna designated for WCDMA and FDD-LTE, the controller 320 may determine that a no service event has occurred.

In an SVLTE/SGLTE mode, i.e., when operating in an SVLTE/SGLTE area, the controller 320 may determine whether the modem selected to perform network search is a data modem or a voice modem (504). (For example, the device may be set up by the manufacturer or via user setting to perform an initial search using either a data modem or a voice modem.)

If the selected modem is a voice modem, a search is performed for a network corresponding to a first voice communication method or methods through the voice modem 300 (506). That is, the controller 320 controls the voice modem 300 to search for a frequency band corresponding to the first at least one voice communication method.

If the modem is a data modem at step 504, the controller 320 may search for a network corresponding to the first data communication method(s) through the data modem 340 (508). That is, the controller 320 controls the data modem 340 to search for a frequency band corresponding to the first at least one data communication method.

In order words, the controller 320 may control an operation of independently providing a voice service and a data service using a first voice communication method of the voice modem 300 and a first data communication method of the data modem 340 in an SVLTE mode.

If the electronic device is in a CSFB mode, e.g., if the electronic device moves from an SVLTE/SGLTE area to a CSFB area or performs roaming at step 502, the controller 320 may search for a network corresponding to a second at least one data communication method through the data modem 340 and a network corresponding to a second voice communication method for roaming (510). That is, the controller 320 may control the data modem 340 to search for a frequency band corresponding to a second at least data communication method and a second voice communication method for roaming. Here, the second at least one data communication method is a communication method related to CSFB and may be, for example, FDD-LTE and WCDMA communication methods.

In operation 512, it is determined whether a network search has succeeded (512). If so, a network is successfully accessed, and the method of FIG. 5 is terminated. If a network search fails, the controller 320 may perform a corresponding mode. For example, in a corresponding mode, the controller 320 may again attempt a network search according to an SVLTE/SGLTE mode or a CSFB mode.

Figure 6:
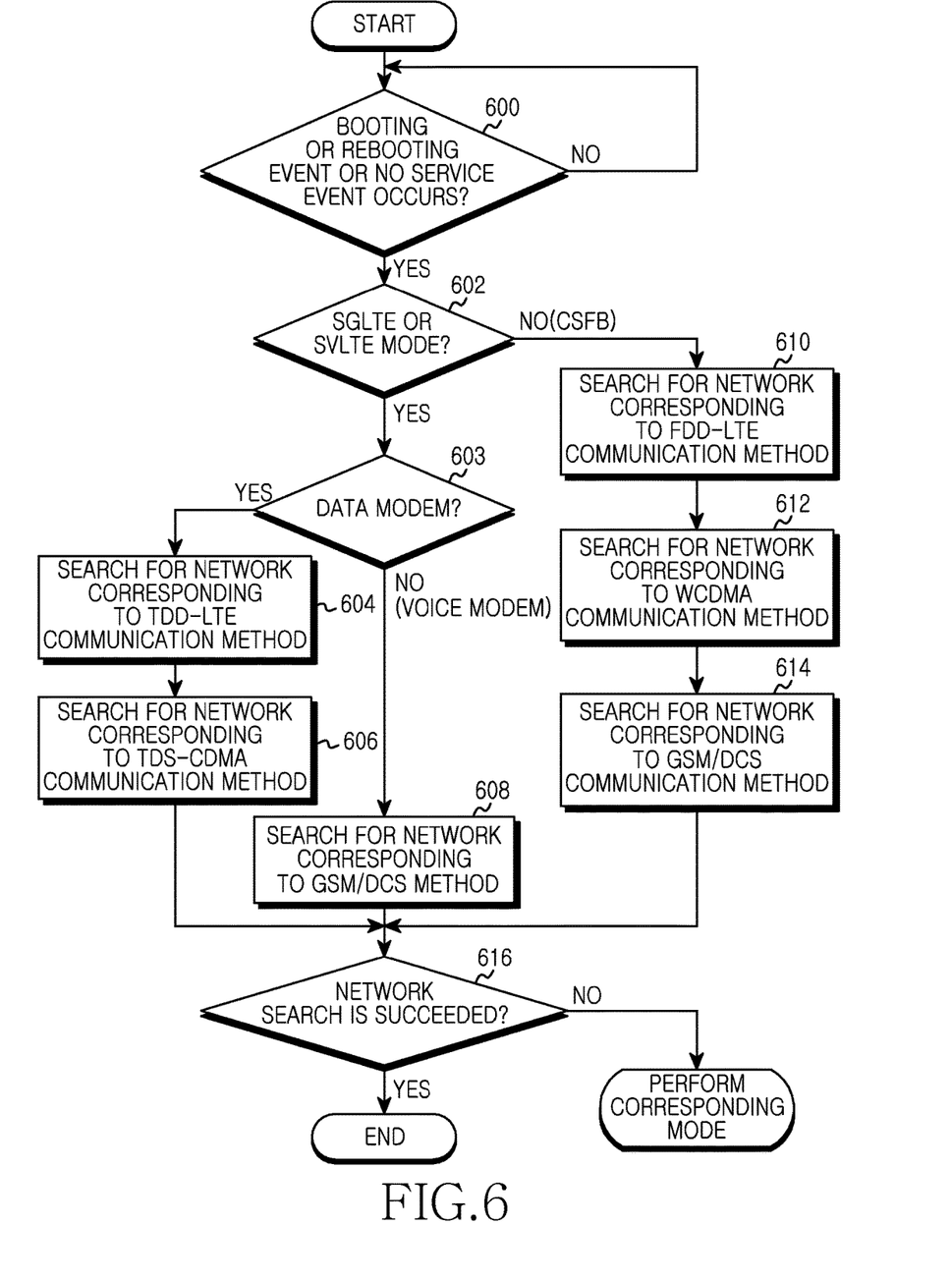
FIG. 6 is a flowchart illustrating a network search method in a wireless communication environment supporting a plurality of communication methods according to various embodiments of the present invention.

FIG. 6 is a flowchart illustrating a network search in a wireless communication environment supporting a plurality of communication methods according to various embodiments of the present invention. In operation 600, it is determined whether a booting or rebooting event or no service event occurs, if so, it is determined whether the electronic device is in an SVLTE/SGLTE mode or a CSFB mode (602). Here, a no service event may indicate a state in which a signal is not received through an antenna used for data in a band of a corresponding communication method.

If the electronic device is in an SVLTE/SGLTE mode, i.e., if the electronic device operates in an SVLTE area, the controller 320 may determine whether a modem designated for an initial network search is a data modem or a voice modem (603).

If the modem is a voice modem, the controller 320 may search for a network corresponding to a GSM or DCS voice communication method through the voice modem 300 (608). That is, the controller 320 controls the voice modem 300 to search for a frequency band corresponding to a GSM or DCS voice communication method.

If the modem for network search is designated as a data modem at step 603, the controller 320 may search for a network corresponding to a TDD-LTE communication method through the data modem 340 (604).

The controller 320 may search for a network corresponding to a TDS-CDMA communication method through the data modem 340 (606). That is, the controller 320 may control the data modem 340 to search for a frequency band corresponding to a TDD-LTE communication method and a TDS-CDMA communication method.

In order words, device 120 supports a voice service through GSM/DCS of the voice modem 300 in an SVLTE/SGLTE mode and independently provides data service using a TDD-LTE or TDS-CDMA of the data modem 340.

If device 120 is in a CSFB mode, e.g., if the electronic device moves from an SVLTE/SGLTE area to a CSFB area or performs roaming at step 602, a search may be performed for a network employing FDD-LTE through the data modem 340 (610).

In operation 612, controller 320 may search for a network employing WCDMA through the data modem 340 (612).

In operation 614, controller 320 may search for a network employing a 2G roaming method (e.g., GSM, DCS) through the data modem 340 (614). While performing a data service based on an FDD-LTE communication method in a CSFB mode, when a voice call is received, the controller 320 may switch from FDD-LTE to WCDMA and support voice and data services.

The controller 320 determines whether a network search has succeeded (616). If so, the method of FIG. 6 may be terminated; if not, i.e., if a network search is failed, the controller 320 may perform a corresponding mode. For example, the controller 320 may again attempt a network search according to an SVLTE/SGLTE mode or a CSFB mode in a corresponding mode. For example, in the SVLTE mode, the same frequencies that have already been scanned in the SVLTE mode may be scanned again, rather than beginning a scan for frequencies in the CSFB mode.

Methods according to embodiments described herein may be implemented in a form of hardware, with the aid of software, or with a combination of hardware and software.

When implemented with the aid of software, a computer readable storage medium that stores at least one program (software module) may be provided. At least one program stored at a computer readable storage medium is configured for execution by at least one processor within an electronic device. At least one program includes instructions that enable an electronic device to execute methods according to embodiments described in a specification and/or claims of the present invention.

Such a program (software module, software) may be stored at a non-volatile memory including a Random Access Memory (RAM) and a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of a portion or the entire thereof. Further, each constituent memory may be included in plural.

Further, the program may be stored at an attachable storage device that may access through a communication network such as Internet, Intranet, a Local Area Network (LAN), a Wireless LAN (WLAN), or a Storage Area Network (SAN) or a communication network formed with a combination thereof. Such a storage device may access to the electronic device through an external port.

Further, a separate storage device on the communication network may access to a portable electronic device.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

As described above, in a wireless communication environment supporting a plurality of communication methods, in no service state or in a booting state, the electronic device searches for only a network corresponding to a corresponding communication method according to a communication service policy of a corresponding region or nation and thus a network search time and a recovery time can be reduced and the likelihood of a voice call drop can be reduced.

While the present invention has been particularly shown and described with reference to embodiments thereof, it will be understood by those skilled in the art that various changes in form and details may be made therein without departing from the spirit and scope of the present invention as defined by the appended claims. Therefore, the scope of the present invention is not limited to the described embodiment but should be determined by the appended claims and their equivalents.

What is claimed is:

1. A method implemented in an electronic device, the method comprising:
   in response to detection of a no-service state or a booting state, detecting communication mode for a long term evolution (LTE) network operating in the electronic device;
   if a Simultaneous Voice and LTE (SVLTE) communication mode is detected, searching a signal in at least one frequency band corresponding to an first communication protocol used in the SVLTE communication mode, except in at least one other frequency band corresponding to a second communication protocol used in a Circuit Switch-Fall Back (CSFB) communication mode, in a frequency search range of electronic device, wherein the frequency search range includes a plurality of frequency band corresponding to the first communication protocol and the second communication protocol;
   if the CSFB communication mode is detected, searching a signal in at least one other frequency band corresponding to the second communication protocol, except in the at least one frequency band corresponding to the first communication protocol, in the frequency search range of electronic device,
   wherein the first communication protocol includes a Time-Division Synchronous Code Division Multiple Access (TD-SCDMA) and a Time Division Duplex-Long Term Evolution (TDD-LTE), and
   wherein the second communication protocol includes a Wideband-CDMA (W-CDMA) and a Frequency Division Duplex (FDD)-LTE.

2. The method of claim 1, wherein the searching for a signal in at least one frequency band comprises:
  searching in a band corresponding to a 2G communication method through a first modem; and
  searching in a band corresponding to a communication method for a data service through a second modem.

3. The method of claim 1, wherein a first antenna is an antenna designated for a voice service,
  wherein a second antenna is an antenna designated for a data service, and
  wherein the first antenna is operatively coupled to a first modem to support a voice service in the SVLTE communication mode and operatively coupled connected to a second modem to support a voice service in the CSFB communication mode.

4. The method of claim 1, wherein the second modem implements at least one communication method related to the SVLTE communication mode and at least one communication method related to the CSFB communication mode.

5. An electronic device, comprising:
  a first antenna;
  a second antenna;
  a first modem connected to the first antenna;
  a second modem connected to the second antenna; and
  a controller configured to:
    detect a communication mode for a long term evolution (LTE) network operating in the electronic device in response to detection of a no-service state, and
    search, if a Simultaneous Voice and LTE (SVLTE) communication mode is detected, a signal in at least one frequency band corresponding to an first communication protocol used in the SVLTE communication mode, except in at least one other frequency band corresponding to a second communication protocol used in a Circuit Switch-Fall Back (CSFB) communication mode, in a frequency search range of electronic device, wherein the frequency search range includes a plurality of frequency band corresponding to the first communication protocol and the second communication protocol,
    wherein the first communication protocol includes a Time-Division Synchronous Code Division Multiple Access (TD-SCDMA) and a Time Division Duplex-Long Term Evolution (TDD-LTE), and
    wherein the second communication protocol includes a Wideband-CDMA (W-CDMA) and a Frequency Division Duplex (FDD)-LTE.

6. The electronic device of claim 5, wherein the controller is configured to search for a band corresponding to a 2G communication method through the first modem and search for a band corresponding to a communication method for a data service through the second modem.

7. The electronic device of claim 5, wherein the controller is further configured to search a signal in at least one other frequency band corresponding to the second communication protocol used in the CSFB communication mode, except in the at least one frequency band corresponding to the first communication protocol used in the SVLTE communication mode, if the CSFB communication mode is detected.

8. The electronic device of claim 5, wherein the first antenna is an antenna for a voice service,
  wherein the second antenna is an antenna designated for a data service, and
  wherein the first antenna is operatively coupled to the first modem to support a voice service in the SVLTE communication mode and is operatively coupled to the second modem to support a voice service in the CSFB communication mode.

9. The electronic device of claim 5, wherein the second modem operates according to at least one communication method related to the SVLTE communication mode and at least one communication method related to the CSFB communication mode.

* * * * *